United States Patent
Walls et al.

(10) Patent No.: US 7,020,812 B2
(45) Date of Patent: Mar. 28, 2006

(54) SYSTEM AND METHOD FOR DETECTION AND RECOVERY OF FALSE SYNCHRONIZATION USING PACKET HEADER INFORMATION

(75) Inventors: Frederick G. Walls, Tustin, CA (US); Thomas L. Spieker, San Juan Capistrano, CA (US); Jorge J. Wong, Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 316 days.

(21) Appl. No.: 10/246,002

(22) Filed: Sep. 18, 2002

(65) Prior Publication Data

US 2004/0030967 A1  Feb. 12, 2004

Related U.S. Application Data

(63) Continuation-in-part of application No. 10/217,979, filed on Aug. 12, 2002, now Pat. No. 6,920,592.

(51) Int. Cl.
*G06F 11/00* (2006.01)
(52) U.S. Cl. ...................................... 714/707
(58) Field of Classification Search ................ 714/704, 714/706, 707, 708, 789, 798; 375/365
See application file for complete search history.

(56) References Cited

U.S. PATENT DOCUMENTS 4,686,690 A * 8/1987 Sato ........................... 375/365

* cited by examiner

*Primary Examiner*—Joseph Torres
*Assistant Examiner*—James C. Kerveros
(74) *Attorney, Agent, or Firm*—McAndrews, Held & Malloy, Ltd.

(57) ABSTRACT

Presented herein are system(s), method(s), and apparatus f or detecting and recovering from false synchronization. When incorrect checksums are encountered, false synchronization and general noisy considerations are distinguished as causes of the incorrect checksums by examining the header data. For example, in one embodiment, a count can be kept and false synchronization and noisy conditions can be distinguished based on the number of detected null packets. In another embodiment, a count of detected PAT packets can be kept, and false synchronization and noisy conditions can be distinguished based on the number of detected PAT packets. In another embodiment, continuity information can be monitored and false synchronization and noisy conditions can be distinguished based on the continuity of the data packets.

13 Claims, 8 Drawing Sheets

SYSTEM AND METHOD FOR DETECTION AND RECOVERY OF FALSE SYNCHRONIZATION USING PACKET HEADER INFORMATION

RELATED APPLICATIONS

The present application is a continuation-in-part of U.S. application Ser. No. 10/217,979, filed Aug. 12, 2002, entitled "System, Method, and Apparatus for Detection and Recovery from False Synchronization", by Thomas Spieker, Frederick Walls, and Jorge Wong, which is now U.S. Pat. No. 6,920,592, and is incorporated by reference herein in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present application is directed to data communications, and more particularly to a system, method, and apparatus for detecting and recovering from false synchronization using packet header information.

As the speed of Internet traffic increases, on-demand television and video are becoming closer and closer to reality. In addition to the increasing speed of Internet transactions, continued advancement of motion picture content compression standards permit high quality picture and sound while significantly reducing the amount of data that must be transmitted. A compression standard for television and video signals was developed by the Moving Picture Experts Group (MPEG), and is known as MPEG-2. The MPEG-2 compression scheme compresses and packetizes the video content into MPEG-2 packets.

The MPEG-2 standard has a number of variants based on the specific transmission channel. For instance, the ITU specification J.83 Annex B (the J.83 specification) was developed for the transmission of digital data over a cable channel. The J.83 specification prescribes application of a parity checksum byte and forward error correction to the MPEG-2 packets, and is hereby incorporated by reference for all purposes. The foregoing allows for additional error detection and simultaneous error detection and synchronization.

The MPEG-2 packets are received as a continuous stream of serial data. Recovery of the original video content requires breaking the continuous stream of serial data into the individual constituent packets. Given the starting point of an MPEG-2 packet, the receiver can break the continuous stream into the individual constituent data packets by simply counting the number of bits received because the MPEG-2 packets are of a known uniform length (1504 bits). The starting point of a packet is determined by calculation and detection of a predetermined eight-bit checksum. Detection of the predetermined checksum is indicative of the beginning of an MPEG-2 packet. Detection of the predetermined checksum is used to establish MPEG synchronization and lock alignment. Once alignment has been locked, the absence of the predetermined checksum at expected locations (every 1504 bits) is indicative of bit errors.

Presently, MPEG synchronization is conditioned on receipt of a number of consecutive checksums. Each data packet contains 188 bytes or 1,504 bits. A checksum circuit could start looking at an arbitrary point within those 1,504 bits with equal probability. Since there is only one correct phase, 1,503 incorrect phases, and only 256 possible checksums, the first checksum reported as correct is likely to be in an incorrect phase. However, assuming the MPEG packets are not all identical, there is only a one in 256 chance that the next checksum will be reported as being correct if the synchronization is incorrect. There is a one in 65,536 chance that the next two correct checksums will be reported correct. The probability that the next five packets will be reported correct is less than one in a trillion. Since this probability rapidly approaches zero, false synchronization in this case can easily be avoided.

However, if five identical packets are received consecutively, the odds dramatically shift. The probability of synchronizing incorrectly the first attempt is the same, roughly 1,248 in 1,504. However, subsequent packets each guarantee the same checksum since data in the subsequent packets are the same. So, even after five packets, the probability of incorrectly synchronizing is still significant. One example where a number of consecutive identical packets are transmitted would be in a video on demand environment where channel usage varies depending on customer demand and MPEG NULL packets are used to fill up the unused bandwidth.

Another problem with conditioning MPEG synchronization on a number of consecutive checksums, is that calculation of many checksums requires a significant amount of time. The foregoing results in noticeable delays that are extremely undesirable during television channel change operations.

Another technique counts a given number of bad checksums out of a fixed window. For example, bad checksums are counted within a sliding window of 255 checksums. If the number of bad checksums exceeds a certain number, e.g., 50, the current synchronization is abandoned and resynchronization is attempted. The drawback to this approach is that normal bit errors can cause bad checksums and therefore, cause a resynchronization under noisy conditions, even where synchronization is correct.

Accordingly, it would be advantageous if false synchronization detection and recovery are guaranteed in a sufficient amount of time.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Presented herein are system(s), method(s), and apparatus for detecting and recovering from false synchronization. During false synchronization, after a sufficient time, an MPEG Framer detects incorrect checksums in the data packets at bit locations expected to indicate the start of an individual packet. However, incorrect checksums can be indicative of either false synchronization or general noisy conditions. False synchronization and general noisy conditions are distinguishable by examination of packet header content.

For example, a MPEG bit stream is expected to contain at least a certain proportion of null packets and Program Association Tables (PATs). When incorrect checksums are accompanied by fewer null packets, and/or fewer PATs, the probability of false synchronization is greater. In contrast, when incorrect checksums are not accompanied by fewer null packets, and/or fewer PATs, the probability of noisy conditions is greater.

For another example, false synchronization causes detection of continuity counter errors. Therefore, when incorrect checksums are accompanied by a large number of detected continuity errors, the likelihood of false synchronization is greater. In contrast, noisy conditions are not likely to cause substantial continuity errors to be detected. Accordingly, wherein the incorrect checksums are not accompanied by substantial continuity errors, the likelihood of noisy conditions is increased.

False synchronization can be detected on the fly either on an interrupt-driven basis or a polling-driven basis. In the interrupt-driven basis, an examination of the number of null packets, PATs, and/or continuity errors is triggered when the number of incorrect checksums attains a certain value or a specified period of time elapses. In the polling-driven basis, the comparison occurs at predetermined time intervals.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

The embodiments presented herein will be better understood with reference to the following figures.

DETAILED DESCRIPTION OF THE INVENTION

While the detailed description that follows is made with specific reference to the MPEG-2 standard, it should be understood that the aspects of the present invention may be applied to other streams of data requiring synchronization, including, for example, the DOCSIS Standard described in CableLabs Data-Over-Cable Service Interface Specifications (DOCSIS) SP-RFIv2.0.

Figure 1:
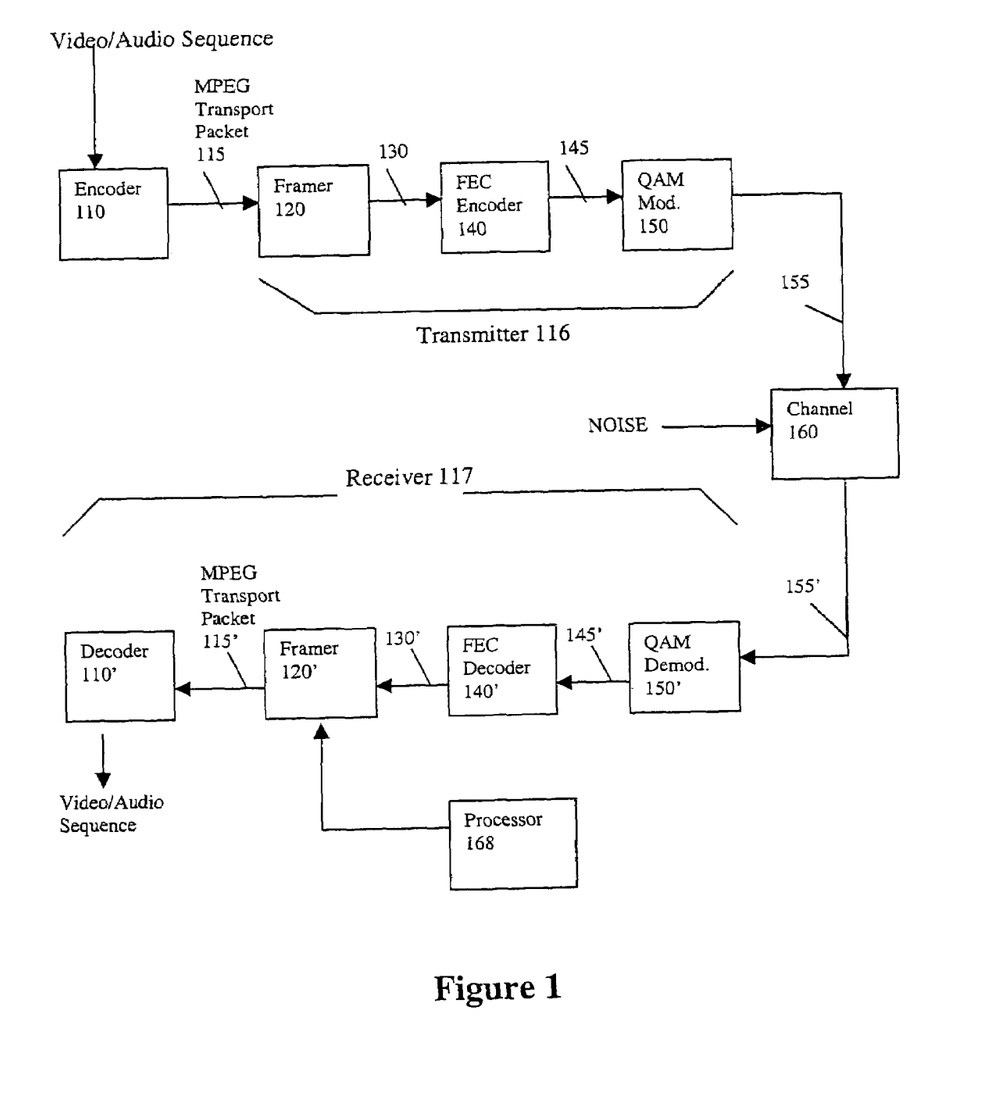
FIG. 1 is a block diagram of an exemplary cable transmission system.

Referring now to FIG. 1, there is illustrated a block diagram of an exemplary cable transmission system for transmitting MPEG packets 115 from a transmitter 116 to a receiver 117 in accordance with one embodiment of the present invention. The MPEG packets 115 include packets of compressed data output from an MPEG Encoder 110. The compressed data represents a video/audio sequence. The MPEG Encoder 110 receives one or more video/audio sequence, processes and multiplexes the video/audio sequences in accordance with the MPEG-2 standard. The MPEG-2 standard is described in detail in ITU-T Recommendation H.222.0 (1995) | ISO/IEC 13818-1:1996, *Information Technology—Generic Coding of Moving Pictures and Associated Audio Information Systems*, which is hereby incorporated herein by reference for all purposes.

Figure 2:
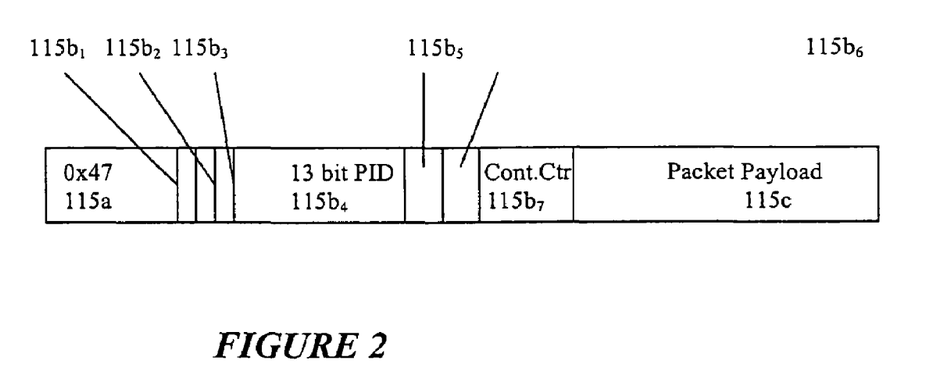
FIG. 2 is a block diagram of a data packet in accordance with the MPEG-2 standard.

Referring now to FIG. 2, there is illustrated a block diagram of an MPEG-2 packet 115. The MPEG-2 packet 115 comprises 188 bytes, with one byte 115a for synchronization purposes, three bytes 115b for a header, followed by 184 bytes 115c of data. The synchronization byte 115a is specified to have a constant value of 0x47. The header 115b contains a one bit transport packet error indicator $115b_1$, a one bit payload unit start indicator $115b_2$, a one bit transport priority $115b_3$, a thirteen bit packet identifier (PID) $115b_4$, a two bit transport scrambling control $115b_5$, two bits adaption field control $115b_6$, and a four bit continuity counter $115b_7$.

The PID $115b_4$ provides a mechanism for multiplexing and demultiplexing bit streams, by enabling identification of packets belonging to a particular elementary or control bit stream. Various PIDs $115b_4$ are associated with different channels. Additionally, the PID of 0x1FFF is associated with a null packet. The PID of 0x0000 is associated with a program association table. The continuity counter $115b_7$ cycles from 0 to 15 for each PID $115b_4$ in a packet that carries a data payload. Reception of packets associated with a PID $115b_4$ with discontinuity in the continuity counter $115b_7$ indicates that data has been lost in transmission.

The location of the PID $115b_4$ and continuity counter $115b_7$ are fixed and extraction of sequential packets corresponding to a particular elementary bit stream is very simply achieved once packet synchronization is established by filtering packets based on PID $115b_4$ and sorting the packets based on continuity counter $115b_7$. The fixed packet length makes for simple filter and demultiplexing implementations suitable for high-speed transmission systems.

Referring again to FIG. 1, the transmitter 116 includes MPEG Framing 120, a Forward Error Correction (FEC) encoder 140, and a Quadrature Amplitude Modulation (QAM) modulator 150. The MPEG Framing 120 calculates and places a parity checksum byte into the synchronization byte 115a of the MPEG packets 115. The FEC encoder adds layers of error correction to the MPEG packets 115. The QAM modulator 150 modulates and transmits the MPEG packets 115.

The MPEG-2 packets 115 are received by MPEG framing 120. Pursuant to the ITU specification J.83 Annex B for transmission of digital data over cable, the MPEG framing 120 adds an additional layer of processing which utilizes the information bearing capacity of the synchronization byte 115a. A parity checksum which is a coset of a finite input response parity check linear block code is substituted for the synchronization byte 115a, thereby supplying improved packet delineation functionality and error detection capability.

Figure 3:
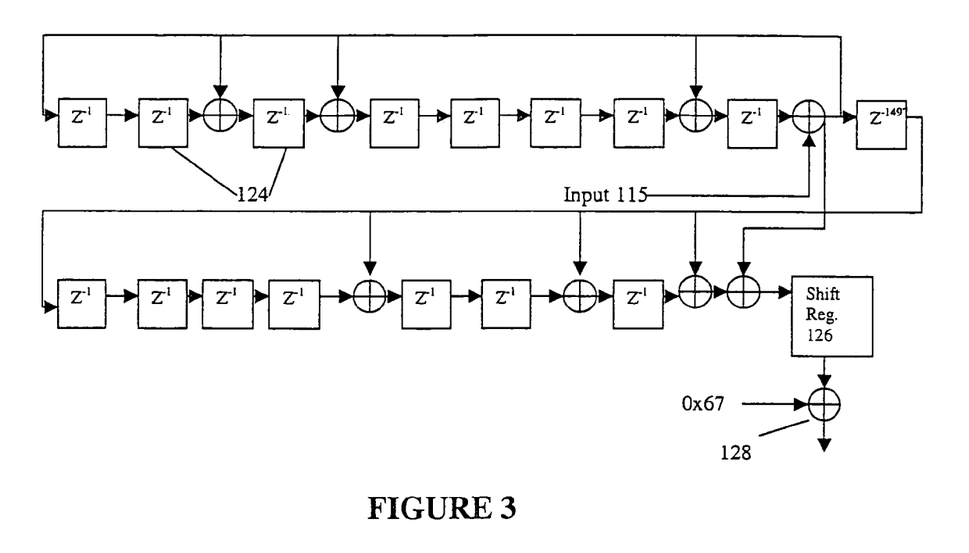
FIG. 3 is a block diagram of an exemplary checksum generator.

Referring now to FIG. 3, there is illustrated an exemplary checksum generator for generating the parity checksum. The checksum generator comprises a linear feedback shift register (LFSR) 122. The LFSR 122 is described by the following equation:

$$f(X)=[1+b(X)X^{1497}]/g(X)$$

where $g(X)=1+X+X^5+X^6+X^8$ and $$b(X)=1+X+X^3+X^7$$

All addition operations in the LFSR 122 are modulo-2 based. The LFSR 122 is first initialized so that all memory elements 124 contain zero value. The synchronization byte 115a is removed from the MPEG packet. The header 115b and the data 115c portions (1496 bits) of an MPEG packet are shifted into the LFSR 122. The encoder input is set to zero after the header 115b and data portions 115c are received, and eight additional shifts are required to sequentially output the last remaining bits onto shift register 126. An offset of 0×67 is added at adder 128 to contents in the shift register 126. The output of the adder 128 is the parity checksum. The parity checksum is concatenated to the header portion 115b and the data portion 115c. The foregoing causes a 0×47 result to be produced during checksum decoding.

Figure 4:
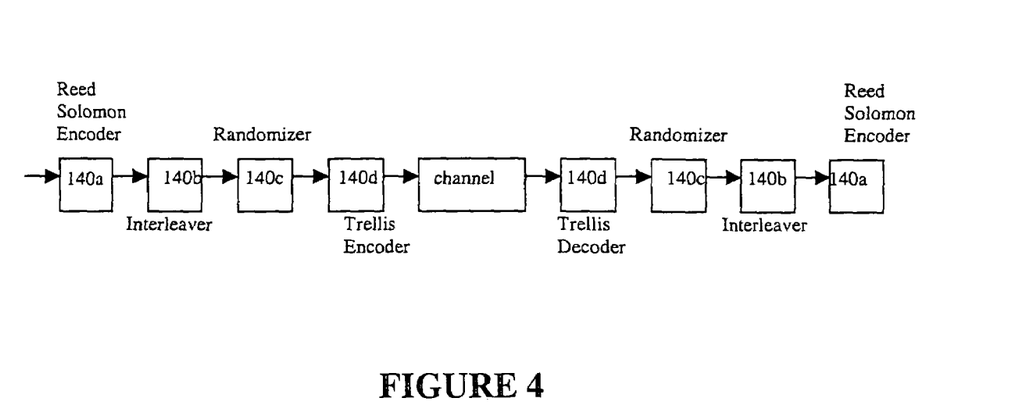
FIG. 4 is a block diagram of an exemplary forward error correction encoder/decoder system.

The MPEG packets (with the parity checksum) 130 are sent to the FEC encoder 140. Referring now to FIG. 4, there is illustrated an exemplary FEC encoder 140. The FEC encoder 140 comprises four layers of processing. The four layers of processing include a Reed-Solomon (RS) encoder 140a, an interleaver 140b, a randomizer 140c and a Trellis encoder 140d. The RS encoder 140a provides block encoding and decoding to correct up to three symbols within each encoded block. The interleaver 140b evenly disperses the symbols, protecting against a burst of symbol errors. The randomizer 140c randomizes the data on the channel to allow effective QAM demodulator synchronization. The Trellis encoder 140d provides convolutional encoding.

Referring again to FIG. 1, the MPEG packets 145 output from the FEC encoder 140 are modulated and transmitted by the QAM modulator 150. The QAM modulator 150 transmits the modulated MPEG packets 155 over a communication channel 160, e.g., a cable 160.

Those skilled in the art will recognize that there is a degree of noise 165 over the channel 160. For example, a cable channel 160 is primarily regarded as a bandwidth-limited channel corrupted by a combination of noise, interference, and multi-path distortion. The noise results in receipt of modulated MPEG packets 155' which are equivalent to modulated MPEG packets 155 plus the noise 165 at the receiver 117.

The receiver 117 processes the received modulated MPEG packets 155', providing video/audio sequences which are perceptually similar to the original video/audio sequences. The receiver 117 includes QAM demodulator 150', a FEC decoder 140', an MPEG Framer 120', and an MPEG Decoder 110'. The QAM demodulator 150' demodulates the received modulated MPEG packets 155'. The FEC decoder 140' reverses the layers of error correction applied by FEC encoder 140, and detects and corrects errors in the MPEG packets 155'. The MPEG Framer 120' is used for synchronization purposes. The MPEG Decoder 110' extracts the header information 115b from the MPEG packets 115' and decompresses and demultiplexes the MPEG packets 115' to recover video/audio sequences.

The received modulated MPEG packets 155' are demodulated by the QAM demodulator 150'. The channel noise 165 can result in bit errors when the received modulated MPEG packets 155' are demodulated by the QAM demodulator 150'. The MPEG packets 145' are received by the FEC decoder 140' which reverses the layers of error correction applied by FEC encoder 140. Decoding of the layers of error correction applied by FEC encoder 140 allows both detection and, possibly, correction of the error data signal, up to a certain maximum number of bit errors, in a manner well known in the art.

For example, the RS error correction layer is (128, 122) and has the ability to correct 3 or less RS symbol errors. The RS error correction layer is described in further detail in Section B.5.1 of ITU-T Recommendation J.83, Television and Sound Transmission—Digital Multi-Programme Systems for Television Sound and Data Services for Cable Distribution, which is hereby incorporated herein by reference for all purposes. The result are MPEG packets 130' which are ideally identical to the MPEG packets 130.

It is noted that the MPEG packets 130' are received as a continuous stream. Continued processing of the MPEG packets 130' requires breaking the continuous stream into the individual constituent MPEG packets 130'. With the starting point of an individual MPEG packet 130' in the continuous stream, the continuous stream can be broken into the individual constituent MPEG packets by simply counting the number of bits received because the packets are of a known uniform length.

Figure 5:
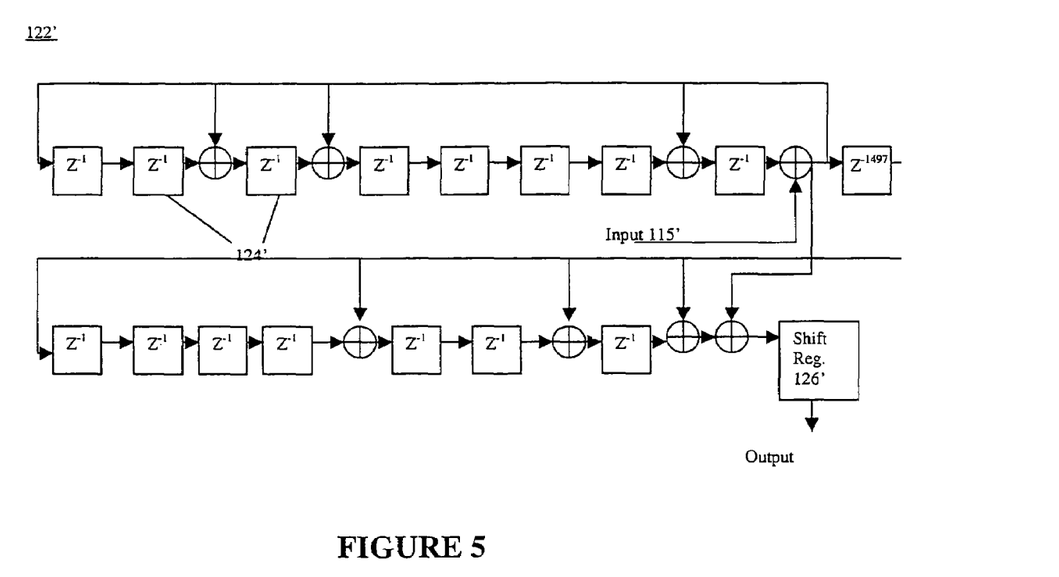
FIG. 5 is a block diagram of an exemplary checksum decoder circuit.

The MPEG packets 130' are received by MPEG-2 Framing 120'. The MPEG-2 Framing 120' breaks the MPEG packets 130' into MPEG packets 115'. The MPEG-2 Framing 120', can be implemented by an LSFR. Referring now to FIG. 5, there is illustrated a block diagram of an exemplary LSFR 122' configured for calculation of the checksum of incoming MPEG packets 130'. The LSFR 122' is similar to the LSFR 122 of FIG. 2, except that no offset is added to the shift register 126'.

The MPEG packets 130' are received as a serial data bit stream at input. The decoder circuit 122' computes a sliding checksum on the input serial data bit stream stored in shift register 126'. Based on the encoding of the MPEG packets 130', when the 1504 bits forming a single frame packet 130' are received in the decoder circuit 122' (in the delay units Z), the checksum generated in the shift register 126 is 0×47. Accordingly, detection of 0×47 in the register 126 is used to detect the start of an MPEG-2 packet 130'. Once the start of a packet is detected, a locked alignment is established and the absence of a valid code (0×47) at the expected bit interval (every 1504 bits) is indicative of an error. Simultaneous packet synchronization and error detection are supported in the foregoing manner.

The MPEG Framing 120' is operable in two modes for example—a synchronization lock mode and a resynchronization mode. While in the synchronization lock mode, bit alignment is established and the absence of the valid code (0×47) in the shift register 126 at the expected bit interval (every 1504 bits) is indicative of an error. While in the resynchronization mode, bit alignment is not established. The shift register 126 is monitored for the valid code. Detection of a valid code is indicative of the start of a packet.

Figure 6:
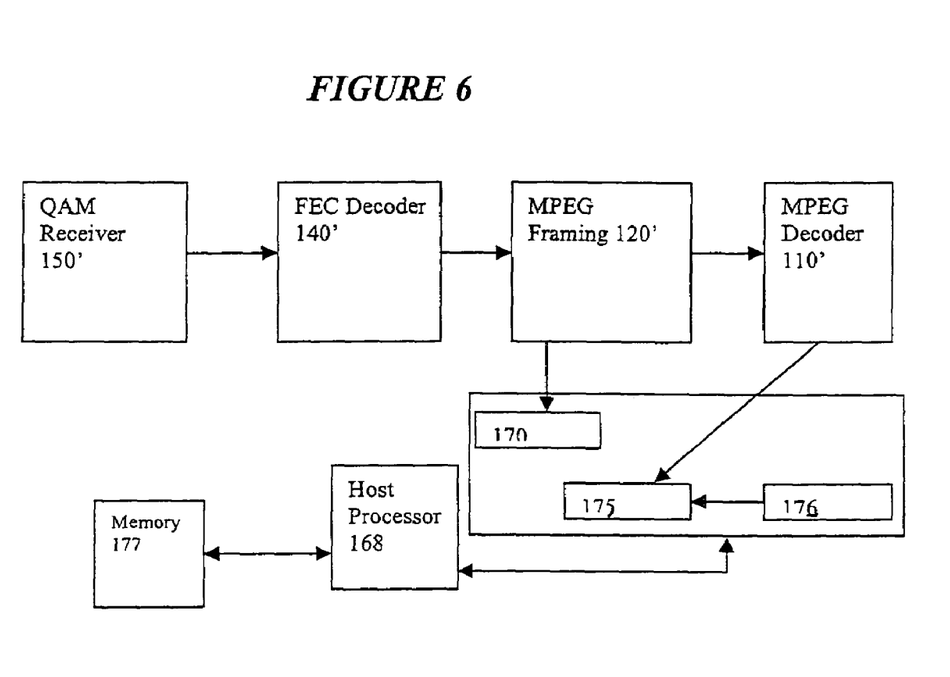
FIG. 6 is a block diagram of an exemplary receiver in accordance with one embodiment of the present invention.

The specific mode in which the MPEG Framing 120' operates is controlled by the processor 168. The processor 168 controls the modes of operation of the MPEG Framing 120' in a manner to detect and recover from false synchronization. As noted above, there is a considerable probability of false synchronization wherein synchronization is based on detection of a predetermined checksum. False synchronization is detected by the existence of incorrect checksums at later appropriate bit intervals (every 1504 bits). Incorrect checksums can also occur due to general noisy conditions. Noisy conditions cause a large number of bit errors to occur, thereby causing incorrect checksum calculations to occur, even if receipt of the data packet is properly synchronized. Therefore, when incorrect checksums are detected, false synchronization and general noisy conditions must be distinguished as the cause of the incorrect checksums.

False synchronization and general noisy conditions can be distinguished by examination of the extracted header information. For example, the MPEG packets 115' are expected to include at least a certain amount of null packets and packets containing PATs (PAT packets), e.g., at least one null packet and one PAT packet every 0.1 seconds. Null packets and PAT packets are identified by examination of the PID 115$b_4$. The PID 115$b_4$ is extracted from the header 115$b$ by MPEG Decoder 110' based on the relative location within the header 115$b$. However, during false synchronization, erroneous header information will be extracted because the MPEG packets 115' are misaligned. Because of the erroneous header information, the extracted PID 115$b_4$ in null packets 115' and PAT packets 115' will not, in most cases, correspond to the appropriate values, e.g., 0×1fff, or 0×0000.

Additionally, the MPEG packets 115' are expected to be received in a continuous order based on the PID 115$b_4$ and continuity counter 115$b_7$. During false synchronization, erroneous header information will be extracted by the MPEG Decoder 110'. The extracted continuity counters 115$b_7$ in packets 115' will indicate discontinuous reception, even where the packets 115' are actually received in proper order.

Noisy conditions result in corrupted bits in the MPEG packets 115 including the synchronization byte 115$a$. Although bit corruption can result in an erroneous PID 115$b_4$ or an erroneous continuity counter 115$b_7$ it is not likely that the number of null packets 115' and PAT packets 115' with corrupted PIDs 115$b_4$, or packets 115' with a corrupted continuity counter 115$b_7$ will be as substantial as with false synchronization.

Accordingly, false synchronization can be detected and recovered from by examination of the number or frequency of null packets 115', number or frequency of PAT packets 115', and/or number or frequency of continuity errors with respect to the number or frequency of incorrect checksums within a time interval. The threshold values for the amounts or frequencies can be selected based on the amounts of null packets 115' and PAT packets 115' which are preferably slightly lower or less frequent than the expected amounts or frequencies of null packets 115' and PAT packets 115' within a time window, to allow for statistical variations, yet significantly higher or more frequent than the random expectation. A threshold for the number or frequency of continuity errors should generally be selected such that if the proportion of continuity errors to incorrect checksums within a time window exceeds the predetermined threshold, the likelihood of false synchronization is higher than the likelihood of bit corruption in the continuity counter 115$b_7$ due to a noisy channel.

Where incorrect checksums are detected or a specified time window elapses, and where the incorrect checksums are accompanied by (1) at least the predetermined number of detected null packets 115' (2) at least the predetermined number of detected PAT packets 115', and/or (3) at most the predetermined proportion of continuity errors, the processor 168 leaves the MPEG Framing 120' in the synchronization lock mode, in spite of the incorrect checksums. However, where incorrect checksums are detected or a specified time window elapses, and where the incorrect checksums are accompanied by less than the predetermined number of detected null packets 115', less than the predetermined number of detected PAT packets 115', and/or more than the predetermined proportion of continuity errors, the probability of false synchronization increases. Therefore, the processor 168 sets the MPEG Framing 120' to operate in the resynchronization mode.

Referring now to FIG. 6, there is illustrated a detailed block diagram of an exemplary receiver 117. The MPEG Decoder 110' and MPEG Framing 120' are connected to registers 175 and 170, respectively. Although the registers 170 and 175 are shown as separate from the processor 168, it is noted that the registers 170 and 175 may also be part of the processor 168. Registers 175 can maintain a count of detected null packets 115', detected PAT packets 115', and/or continuity errors, or any combination thereof. When the MPEG Decoder 110' detects null packets 115', PAT packets 115', and/or continuity errors, the MPEG decoder 110' transmits a signal to registers 170 causing the registers 175 to appropriately adjust. Similarly, register 170 maintains a count of checksum errors detected by the MPEG Framing 120' while the MPEG Framing 120' is in the synchronization locked mode.

Register 175 is associated with a programmable mask 176. Although the programmable mask 176 is shown separate from the processor 168, the programmable mask 176 may be implemented using a register of the processor 168. The programmable mask 176 is programmable by the processor 168 and stores a predetermined value. When the register 175 equals the value in the mask 176, a signal is transmitted to the processor 168. The signal is received as an interrupt at the processor 168.

Responsive to the interrupt, the processor 168 executes an interrupt subroutine stored in memory 177. The interrupt subroutine causes the processor 168 to examine registers 170 and 175. If the registers 170 and 175 indicate that incorrect checksums within a time window are accompanied by at least the predetermined number of null packets 115', at least the predetermined number of PAT packets 115', and/or at most the predetermined proportion of continuity errors to incorrect checksums, the processor 168 determines that synchronization is correct, leaves the MPEG Framing 120' in the synchronization lock mode, and clears the registers 170, 175.

If the registers 170 and 175 indicate incorrect checksums within a time window are accompanied by less than the predetermined number of null packets 115', less than the predetermined number of PAT packets 115', and/or more than the predetermined proportion of continuity errors, the processor 168 determines that false synchronization has occurred. The processor 168 transmits a signal to the MPEG Framing 120' causing the MPEG 120' Framing to enter the resynchronization mode and clears the registers 170, 175.

The processor 168 can also detect and recover from false synchronization by polling the registers 170 and register 175 at regular time intervals, and examining the contents. If register 170 indicates at least a predetermined number of checksum errors, registers 175 are examined.

If the registers 175 indicate that at least the predetermined number of null packets 115' have been detected, at least the predetermined number of PAT packets 115' have been detected, and/or at most the predetermined proportion of continuity errors have been detected, the processor 168 determines that synchronization is correct, leaves the MPEG Framing 120' in the synchronization lock mode, and clears the registers 170, 175.

If the registers 175 indicate that less than the predetermined number of null packets 115' have been detected, less than the predetermined number of PAT packets 115' have been detected, and/or more than the predetermined proportion of continuity errors have been detected, the processor 168 determines that false synchronization has occurred. The processor 168 transmits a signal to the MPEG Framing 120' causing the MPEG 120' Framing to enter the resynchronization mode and resets the registers 170, 175.

The receiver 117 as described herein may be implemented as a board level product, as a single chip, application specific integrated circuit (ASIC), or with varying levels of the receiver 117 integrated on a single chip with other portions of the system as separate components. The degree of integration of the monitoring system will primarily be determined by speed of incoming MPEG packets, and cost considerations. Because of the sophisticated nature of modem processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory 177 storing the interrupt subroutine is implemented as firmware.

Figure 7:
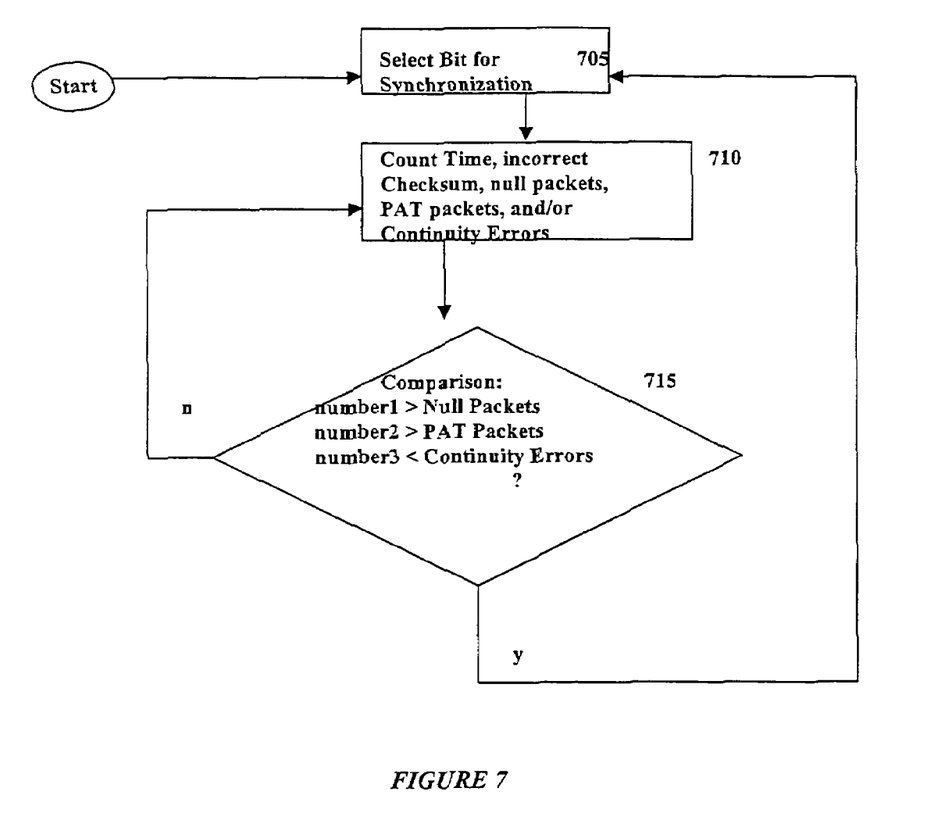
FIG. 7 is a flow diagram of interrupt-driven false synchronization detection and recovery in accordance with one embodiment of the present invention.

Referring now to FIG. 7, there is illustrated a flow diagram describing interrupt driven false synchronization detection and recovery in accordance with one embodiment of the present invention. At 705, a bit in a serial data bit stream is selected as the start of an MPEG packet. The error correction decoding and checksum calculation are performed on the serial data bit stream beginning with the arbitrary bit. At 710, the number of incorrect checksums occurring in phase with the arbitrary bit, detected null packets, PAT packets, and/or continuity errors are monitored until the number of incorrect checksums reaches a predetermined number or a specified time period elapses. When the number of incorrect checksums reaches the predetermined number, the number of detected null packets, the number of PAT packets, and/or the number of continuity errors are examined.

If the registers 170 and 175 indicate that less than the predetermined number of null packets 115' have been detected, less than the predetermined number of PAT packets 115' have been detected and/or more than the predetermined proportion of continuity errors have been detected, another bit is selected (705) as the start of the data packet and 705–715 are repeated. If the registers 170 and 175 indicate that at least the predetermined number of null packets 115' have been detected, at least the predetermined number of PAT packets 115' have been detected, and/or less than the predetermined proportion of continuity errors have been detected, the processor 168 determines that synchronization is correct, leaves the MPEG Framing 120' in the synchronization lock mode, and clears the registers 170, 175. Synchronization on the bit selected during 705 is maintained and 710–715 are repeated.

Figure 8:
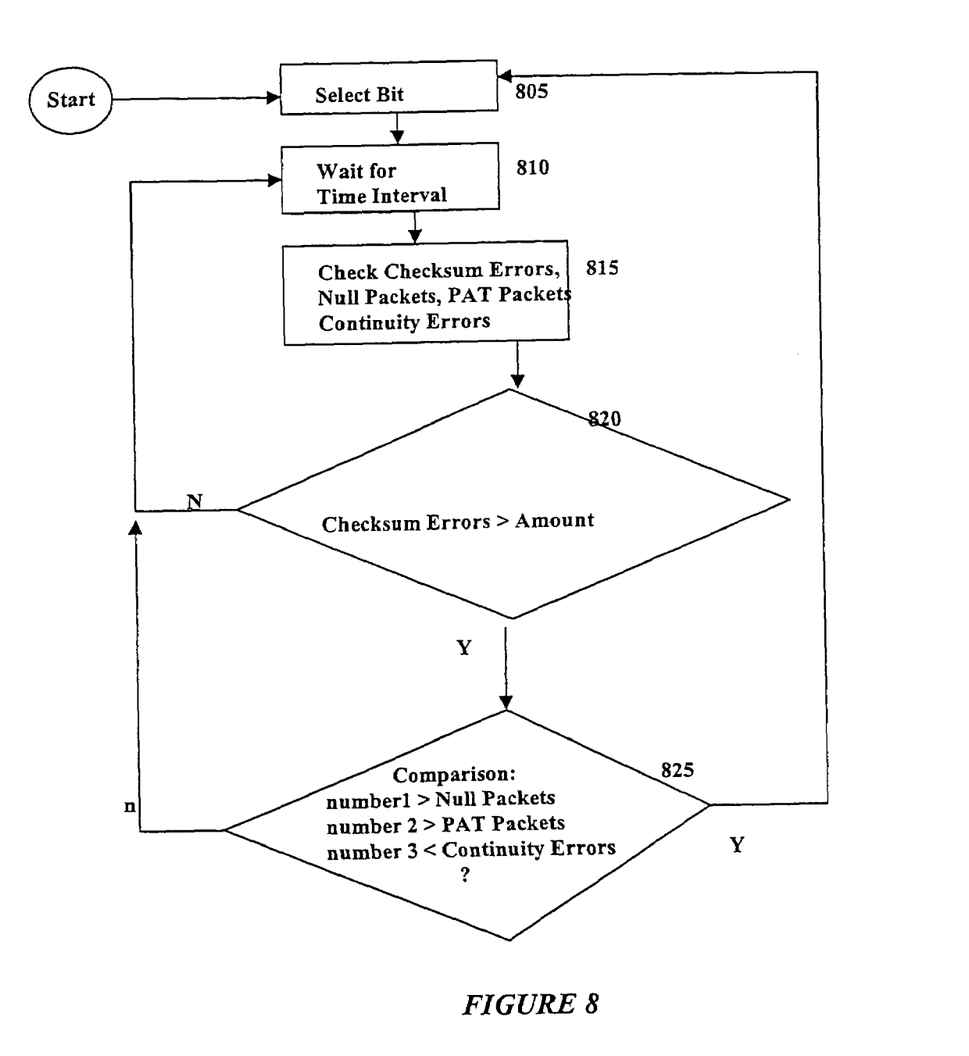
FIG. 8 is a flow diagram of polling-driven false synchronization detection and recovery in accordance with one embodiment of the present invention.

Referring now to FIG. 8, there is illustrated a signal flow diagram describing polling driven false synchronization detection and recovery in accordance with one embodiment of the present invention. At 805, a bit in the serial data bit stream is chosen as the start of an MPEG packet, and the number of checksum errors in phase with the selected bit are counted. The processor 168 waits for a predetermined time interval at 810. While the processor is waiting at 810, the checksum errors, detected null packets, PAT packets, and/or continuity errors are monitored. At the completion of the time interval, the processor 168 examines (815) the number of checksum errors, detected null packets, detected PAT packets, and continuity errors. At 820, if register 175 indicates less than a predetermined number of checksum errors, 810–815 are repeated. At 820, if the checksum errors exceed the predetermined amount, the amount of null packets, PAT packets, and continuity errors are examined (825).

If the registers 170 and 175 indicate that less than the predetermined number of null packets 115' have been detected, less than the predetermined number of PAT packets 115' have been detected, and/or more than the predetermined proportion of continuity errors have been detected, another bit is selected (805) as the start of the data packet and 805–815 are repeated.

If the registers 170 and 175 indicate that at least the predetermined number of null packets 115' have been detected, at least the predetermined amount of PAT packets 115' have been detected, and/or at most the predetermined proportion of continuity errors have been detected, the processor 168 determines that synchronization is correct, leaves the MPEG Framing 120' in the synchronization lock mode, synchronization on the bit selected during 805 is maintained and 810–815 are repeated.

The embodiments described in FIGS. 7 and 8 can be implemented as a series of instructions stored in a memory, such as memory 177, and which are executable by a processor, such as processor 168.

Based on the foregoing, those skilled in the art should now understand and appreciate that the foregoing advantageously provides a technique for guaranteeing false synchronization detection and recovery in a sufficient period of time, and offers an additional layer of protection from a potentially hazardous false synchronization condition. As the detection and recovery can be interrupt-driven, error recovery, in one embodiment, occurs only when necessary, thereby resulting in lower overhead in terms of software and host intervention.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for receiving packets, said method comprising:
   examining header data from received packets;
   counting a number of incorrect checksums associated with the received packets;
   counting a number of received packets with packet identifier fields indicating a null packet; and
   resynchronizing receipt of incoming packets based on the number of received packets with packet identifier fields indicating a null packet and the number of incorrect check sums.

2. The method of claim 1, wherein resynchronizing receipt of incoming packets further comprises:
   resynchronizing receipt of the incoming packets wherein the number of received packets with packet identifier fields indicating a null packet is less than a predetermined amount.

3. The method of claim 1, further comprising:
   counting a number of received packets with packet identifier fields indicating a program association table (PAT) packet.

4. The method of claim 3, wherein resynchronizing receipt of the incoming packets further comprises:
   resynchronizing receipt of incoming packets based on the number of received packets with packet identifier fields indicating a PAT packet, the number of received packets with packet identifier fields indicating a null packet, and the number of incorrect check sums.

5. The method of claim 1, wherein examining the header data further comprises:
   examining fields which indicate continuity information associated with the received packets.

6. The method of claim 5, wherein resynchronizing receipt of the incoming packets further comprises:
   resynchronizing receipt of the incoming packets wherein the continuity information associated with the received packets indicates that the number of the received packets received out of continuous order exceeds a predetermined proportion.

7. A receiver for receiving packets, said receiver comprising:
   a decoder for examining header information from received packets;
   memory for counting incorrect checksums associated with the received packets and a number of received packets with packet identifier fields indicating a program access table (PAT) packet; and
   a processor for causing resynchronization of receipt of the incoming packets based on the number of incorrect checksums and the number of received packets with packet identifier fields indicating a PAT packet.

8. The receiver of claim 7, wherein the memory counts a number of received packets with packet identifier fields indicating a null packet.

9. The receiver of claim 8, wherein the processor causes resynchronization of receipt of the incoming packets based on the number of received packets with packet identifier fields indicating a PAT packet, the number of received packets with packet identifier fields indicating a null packet, and the number of incorrect check sums.

10. The receiver of claim 7, wherein the processor causes resynchronization of receipt of the incoming packets wherein the number of received packets with packet identifier fields indicating a PAT packet is less than a predetermined amount.

11. The receiver of claim 7, wherein the decoder examines fields which indicate continuity information associated with the received packets.

12. The receiver of claim 11, wherein the processor resynchronizes receipt of the incoming packets based on the number of incorrect checksums and the number of received packets with packet identifier fields indicating a PAT packet and wherein the continuity information associated with the received packets indicates that the proportion of the received packets received out of continuous order to the number of checksum errors exceeds a predetermined proportion.

13. A receiver for receiving packets, said receiver comprising:
   a decoder for examining continuity information from the packets;
   memory for counting incorrect checksums associated with the received packets and a number of packets wherein the continuity information indicates that the packets are received out of continuous order; and
   a processor for causing resynchronization of receipt of the incoming packets based on the number of incorrect checksums and the number of packets wherein the continuity information indicates that the packets are received out of continuous order.

* * * * *